United States Patent
Wallace

(10) Patent No.: US 8,419,829 B2
(45) Date of Patent: Apr. 16, 2013

(54) METHOD AND SYSTEM FOR TREATING FISHCHER-TROPSCH REACTOR TAIL GAS

(75) Inventor: Paul Steven Wallace, Katy, TX (US)

(73) Assignee: General Electric Company, Schenectady, NY (US)

( * ) Notice: Subject to any disclaimer, the term of this patent is extended or adjusted under 35 U.S.C. 154(b) by 316 days.

(21) Appl. No.: 12/913,000

(22) Filed: Oct. 27, 2010

(65) Prior Publication Data

US 2012/0103190 A1    May 3, 2012

(51) Int. Cl.
- *B01D 53/22* (2006.01)
- *B01D 53/14* (2006.01)
- *B01D 53/02* (2006.01)
- *B01J 8/00* (2006.01)

(52) U.S. Cl.
USPC .......... 95/55; 95/56; 95/143; 95/236; 95/237; 96/4; 96/9; 96/134; 96/243; 423/418.2; 423/437.1; 423/648.1; 423/655; 422/187

(58) Field of Classification Search .............. 95/45, 55, 95/56, 139, 143, 148, 187, 236, 237; 96/4, 96/9, 108, 134, 243; 423/418.2, 648.1, 655, 423/437.1; 422/187
See application file for complete search history.

(56) References Cited

U.S. PATENT DOCUMENTS

| | | | |
|---|---|---|---|
| 5,139,541 A * | 8/1992 | Edlund ............................. | 95/56 |
| 6,262,131 B1 | 7/2001 | Arcuri et al. | |
| 6,265,453 B1 | 7/2001 | Kennedy | |
| 6,797,243 B2 | 9/2004 | Arcuri et al. | |
| 6,958,364 B1 * | 10/2005 | MacPherson et al. .......... | 95/158 |
| 6,989,135 B2 | 1/2006 | Kennedy | |
| 7,276,105 B2 * | 10/2007 | Pruet ................................ | 95/52 |
| 7,776,208 B2 | 8/2010 | Guo | |
| 7,795,318 B2 | 9/2010 | Van Hardeveld | |
| 2009/0211442 A1 * | 8/2009 | Allam ............................... | 95/96 |
| 2010/0163804 A1 | 7/2010 | Schenck | |

* cited by examiner

*Primary Examiner* — Jason M Greene
(74) *Attorney, Agent, or Firm* — Armstrong Teasdale LLP

(57) ABSTRACT

A method and system for coal-to-liquids (CTL) conversion is provided. The system includes a coal gasifier configured to partially oxidize a coal fuel stream to generate a flow of synthesis gas (syngas), a Fischer-Tropsch (FT) reactor configured to receive the flow of syngas and to generate a stream of tail gas, and an absorber coupled in flow communication downstream of the FT reactor and configured to receive the stream of tail gas. The absorber is further configured to generate a first flow including carbon dioxide, C2 hydrocarbons, and higher boiling gas components (C3+) and a second flow including C1, carbon monoxide, hydrogen, and nitrogen. The system also includes a first membrane separator including a selective membrane configured to separate the second flow from the absorber generating a permeate flow of hydrogen and a non-permeate flow of combustion turbine fuel gas including methane and hydrogen.

20 Claims, 2 Drawing Sheets

METHOD AND SYSTEM FOR TREATING FISHCHER-TROPSCH REACTOR TAIL GAS

BACKGROUND OF THE INVENTION

The field of the invention relates generally to a coal-to-liquids plant with power coproduction, and more specifically, to a method and system of power coproduction using byproduct methane and purge gas from a Fischer-Tropsch coal-to-liquids plant.

At least some known Fischer-Tropsch (FT) based coal-to-liquids plants produce methane (C1), ethane and ethylene (C2) as byproducts which are purged as a tail gas stream. In addition to C1 and C2 hydrocarbons, the tail gas contains a significant amount of unreacted syngas and carbon dioxide ($CO_2$). FT plants are generally used commercially for gas to liquids (GTL) and are configured to recycle the tail gas back to a gasifier, or burn the tail gas for steam and power production. This is economically attractive for GTL since C1 and C2 is the fresh feed to the gasifier and steam and power facilities.

However, for a coal-to-liquids plant, the C1 may be 10-20 times more valuable than the coal on a heating value ($/BTU) basis. Thus it is not economical to recycle C1 to a coal fed gasifier. If a pipeline infrastructure is not available to transport the C1 to a point of more valuable use, then preferential conversion of the C1 to power is desirable. The relatively low heating value of the tail gas and variation in the $CO_2$ content complicate combustion turbine power generation which requires a relatively constant heating value (Wobbe index) fuel.

Coal gasification produces a syngas that contains significantly more nitrogen than syngas from a GTL plant. The additional nitrogen requires more purge syngas from the FT synthesis loop to prevent nitrogen buildup. Coal gasification also produces significantly more waste heat and HP steam reducing the fuel gas demand.

The combination of no gasifier recycle, increased purge syngas, and decreased fuel gas demand causes a fuel gas imbalance.

BRIEF DESCRIPTION OF THE INVENTION

In one embodiment, a system for coal-to-liquids (CTL) conversion includes a coal gasifier configured to partially oxidize a coal fuel stream to generate a flow of synthesis gas (syngas), a Fischer-Tropsch (FT) reactor configured to receive the flow of syngas and to generate a stream of tail gas, and an absorber coupled in flow communication downstream of the FT reactor and configured to receive the stream of tail gas. The absorber is further configured to generate a first flow including carbon dioxide, C2 hydrocarbons, and higher boiling gas components (C3+) and a second flow including C1, carbon monoxide, hydrogen, and nitrogen. The system also includes a first membrane separator including a selective membrane configured to separate the second flow from the absorber generating a permeate flow of hydrogen and a non-permeate flow of combustion turbine fuel gas including methane and hydrogen.

In another embodiment, a method of treating tail gas of a Fischer-Tropsch (FT) reactor includes generating a flow of tail gas using an FT reactor, absorbing carbon dioxide, C2 hydrocarbons, and C3-C7 hydrocarbons from the flow of tail gas generating a flow of lean tail gas including at least C1 hydrocarbons, carbon monoxide, hydrogen, and nitrogen and a flow of absorbent. The method also includes purging the lean tail gas to generate a flow of purge gas including methane, nitrogen, and hydrogen and a flow of remainder gases, separating the flow of purge gas generating a permeate flow of hydrogen and a non-permeate flow of combustion turbine fuel gas including methane, hydrogen and nitrogen, and channeling the non-permeate flow to a power generation system configured to generate a flow of electricity using the non-permeate flow.

In yet another embodiment, a Fisher-Tropsch tail gas treatment system includes a Fischer-Tropsch (FT) reactor configured to generate a flow of tail gas and an absorber coupled in flow communication with the FT reactor and configured to receive the flow of tail gas. The absorber is further configured to separate the tail gas into a flow of lean tail gas including at least C1 hydrocarbons, carbon monoxide, hydrogen, and nitrogen and a flow of absorbent including carbon dioxide, C2 hydrocarbons, and C3-C7 hydrocarbons. The system also includes a lean tail gas purge configured to generate a flow of purge gas including methane and hydrogen and a flow of remainder gases and a membrane separator including a selective membrane configured to separate the flow of purge gas generating a permeate flow of hydrogen and a non-permeate flow of combustion turbine fuel gas including methane and hydrogen.

BRIEF DESCRIPTION OF THE DRAWINGS

FIG. 1 is a schematic diagram of a gasification system in accordance with an exemplary embodiment of the present invention; and FIG. 2 is a schematic diagram of a gasification system in accordance with another exemplary embodiment of the present invention.

DETAILED DESCRIPTION OF THE INVENTION

The following detailed description illustrates embodiments of the invention by way of example and not by way of limitation. It is contemplated that the invention has general application to analytical and methodical embodiments of treating tail gas from a Fischer-Tropsch reactor in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

As used herein, the term "selective" when used in reference to membranes describes the propensity of the membrane to permit the transfer through the membrane of one component of a mixture to which the membrane is exposed relative to other components of the mixture. Thus, a $CO_2$-selective membrane is one which preferentially permits the transfer of $CO_2$ through the membrane relative to the transfer of other components, for example, $H_2S$ and $H_2$, of the mixture.

Figure 1:
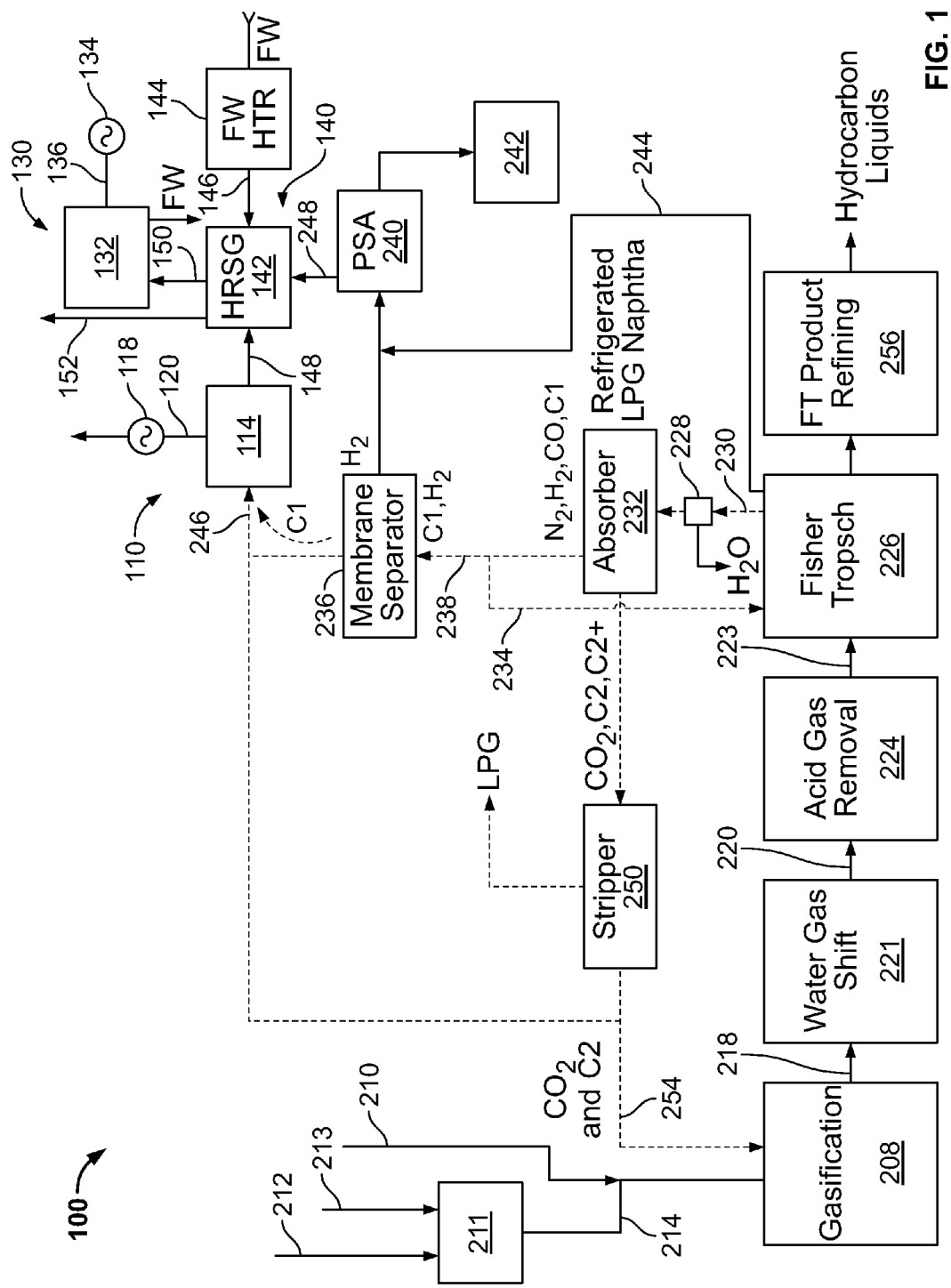
FIGS. 1-2 show exemplary embodiments of the method and system described herein.

FIG. 1 is a schematic diagram of a gasification system 100 in accordance with an exemplary embodiment of the present invention. In the exemplary embodiment, gasification system 100 is an integrated gasification combined-cycle (IGCC) power generation plant that includes a gas turbine engine generator 110. A gas turbine 114 is rotatably coupled to a first electrical generator 118 via a first rotor 120. Gas turbine 114 is coupled in flow communication with at least one fuel source and at least one air source (both described in more detail below) and is configured to receive the fuel and air from the fuel source and the air source, respectively. Gas turbine 114 is configured to mix air and fuel, produce hot combustion gases (not shown), and convert the heat energy within the gases to rotational energy. The rotational energy is transmitted to generator 118 via rotor 120, wherein generator 118 is configured to facilitate converting the rotational energy to electrical energy (not shown) for transmission to at least one load, including, but not limited to, an electrical power grid (not shown).

IGCC plant 100 also includes a steam turbine engine generator 130. In the exemplary embodiment, steam turbine engine generator 130 includes a steam turbine 132 rotatably coupled to a second electrical generator 134 via a second rotor 136.

IGCC plant 100 further includes a steam generation system 140. In the exemplary embodiment, system 140 includes at least one heat recovery steam generator (HRSG) 142 that is coupled in flow communication with at least one heat transfer apparatus 144 via at least one heated boiler feedwater conduit 146. HRSG 142 is configured to receive boiler feedwater (not shown) from apparatus 144 via conduit 146 for facilitating heating the boiler feedwater into steam. HRSG 142 is also configured to receive exhaust gases from turbine 114 via an exhaust gas conduit 148 to further facilitate heating the boiler feedwater into steam. HRSG 142 is coupled in flow communication with turbine 132 via a steam conduit 150. Excess gases and steam are exhausted from HRSG 142 to the atmosphere via stack gas conduit 152.

Conduit 150 is configured to channel steam from HRSG 142 to turbine 132. Turbine 132 is configured to receive the steam from HRSG 142 and convert the thermal energy in the steam to rotational energy. The rotational energy is transmitted to generator 134 via rotor 136, wherein generator 134 is configured to facilitate converting the rotational energy to electrical energy (not shown) for transmission to at least one load, including, but not limited to, the electrical power grid. The steam is condensed and returned as boiler feedwater via a condensate conduit (not shown).

A gasification system 100 includes a gasification reactor 208 that is coupled in flow communication with a flow of oxidant, such as, but not limited to, air through a conduit 210. System 100 also includes a coal grinding and/or slurrying unit 211. Unit 211 is coupled in flow communication with a coal source and a water source (neither shown) via a coal supply conduit 212 and a water supply conduit 213, respectively. In one embodiment, unit 211 is configured to mix the coal and water to form a coal slurry stream (not shown) that is channeled to gasification reactor 208 via a coal slurry conduit 214. Although illustrated showing a coal slurry as a fuel supply, any carboneous material including a dry carboneous material may be used as fuel for gasification system 100.

Gasification reactor 208 is configured to receive the coal slurry stream and flow of oxidant via conduits 214 and 210, respectively. Gasification reactor 208 is also configured to facilitate production of a hot, raw synthetic gas (syngas) stream (not shown). The raw syngas includes carbon monoxide (CO), hydrogen ($H_2$), carbon dioxide ($CO_2$), carbonyl sulfide (COS), and hydrogen sulfide ($H_2S$). $CO_2$, COS, and $H_2S$ are typically collectively referred to as acid gases, or acid gas components of the raw syngas.

In the exemplary embodiment, gasification reactor 208 is coupled in flow communication with a water gas shift reactor 221 via a hot syngas conduit 218. In another embodiment, heat transfer apparatus 144 is coupled in flow communication between gasification reactor 208 and water gas shift reactor 221. Apparatus 144 is configured to receive the hot, raw syngas stream and transfer at least a portion of the heat to HRSG 142 via conduit 146. Subsequently, apparatus 144 produces a cooled raw syngas stream (not shown) that is channeled to a water gas shift reactor 221 through conduit 218. In the exemplary embodiment, hot syngas is channeled directly to water gas shift reactor 221. Water gas shift reactor 221 is configured to convert carbon monoxide and water to carbon dioxide and hydrogen using, for example, the following equation:

$$CO + H_2O \rightarrow CO_2 + H_2 \qquad (1)$$

System 100 further includes, in the exemplary embodiment, an acid gas removal (AGR) subsystem 224 that is directly coupled in flow communication with water gas shift reactor 221 via a shifted syngas conduit 220. In various embodiments, a cooling device is coupled in serial flow communication between water gas shift reactor 221 and AGR subsystem 224, which is configured to receive the cooled shifted syngas stream via a shifted syngas conduit 220. Acid gas removal subsystem 224 is also configured to facilitate removal of at least a portion of acid gas components (not shown) from the raw syngas stream as discussed further below. Such acid gas components include, but are not limited to, $CO_2$, COS, and $H_2S$. Acid gas removal subsystem 224 is further configured to facilitate separation of at least some of the acid gas components into components that include, but are not limited to, $CO_2$, COS, and $H_2S$. Moreover, acid gas removal subsystem 224 is coupled in flow communication with a Fischer-Tropsch reactor 226 via a conduit 223.

The Fischer-Tropsch reaction for converting syngas, which is composed primarily of carbon monoxide (CO) and hydrogen gas ($H_2$), is characterized by the following general reaction:

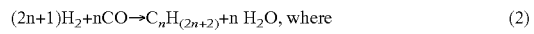

$$(2n+1)H_2 + nCO \rightarrow C_nH_{(2n+2)} + n\,H_2O, \text{ where} \qquad (2)$$

'n' represents a positive integer.

Tail gas generated in FT reactor 226 is channeled to a glycol dryer 228 to remove trace amounts of water through a conduit 230. The dried gas is channeled to an absorber 232 where refrigerated liquefied petroleum gas (LPG) and naphtha is used to absorb most of the C2, much of the $CO_2$, and nearly all of the higher boiling gas components (C3+).

A purge is taken from the lean tail gas to remove C1 and $H_2$ and a remainder is recycled to FT reactor 226 through a conduit 234. The purge gas is routed to a membrane separator 236 through a conduit 238 where a significant fraction (approximately 30-50%) of the hydrogen is extracted. Membrane separator 236 is a selective membrane separator that includes a membrane used to separate a flow of gas into a flow of C1 (methane)-rich gas and a flow of $H_2$-rich gas.

The flow of $H_2$-rich gas (nearly nitrogen free) is compressed and a portion of the hydrogen is recycled to FT reactor 226 through a conduit 244. The remaining hydrogen is channeled to a pressure swing adsorber (PSA) unit 240 that produces substantially pure hydrogen for a hydrocracker FT upgrading unit 242. The non-permeate stream from membrane separator 236 is channeled to gas turbine engine generator 110 as fuel gas through a conduit 246. A flow of PSA tail gas is channeled to HRSG 142 for supplemental firing through a conduit 248.

Absorber 232 and membrane separator 236 are operated so that the residual amounts of $H_2$ and $CO_2$ remain relatively constant in the flow of fuel gas maintaining a relatively constant Wobbe index at gas turbine engine generator 110.

Liquid containing $CO_2$, C2, and C2+ from absorber 232 is channeled to a $CO_2$ stripper 250 where $CO_2$ and the C2 are removed from the liquid. A flow of LPG is removed from a bottom portion of stripper 250. The $CO_2$/C2 offgas is routed to gasification reactor 208 as a recycle $CO_2$ stream through a conduit 254. A portion of the $CO_2$/C2 offgas may be blended with the fuel gas to help control a constant Wobbe index.

An FT product refining subsystem 256 is configured to further process a flow of output liquids from FT reactor 226. FT product refining using a distillation and/or fractionation process to generate a flow of, for example, transportation fuels.

Figure 2:
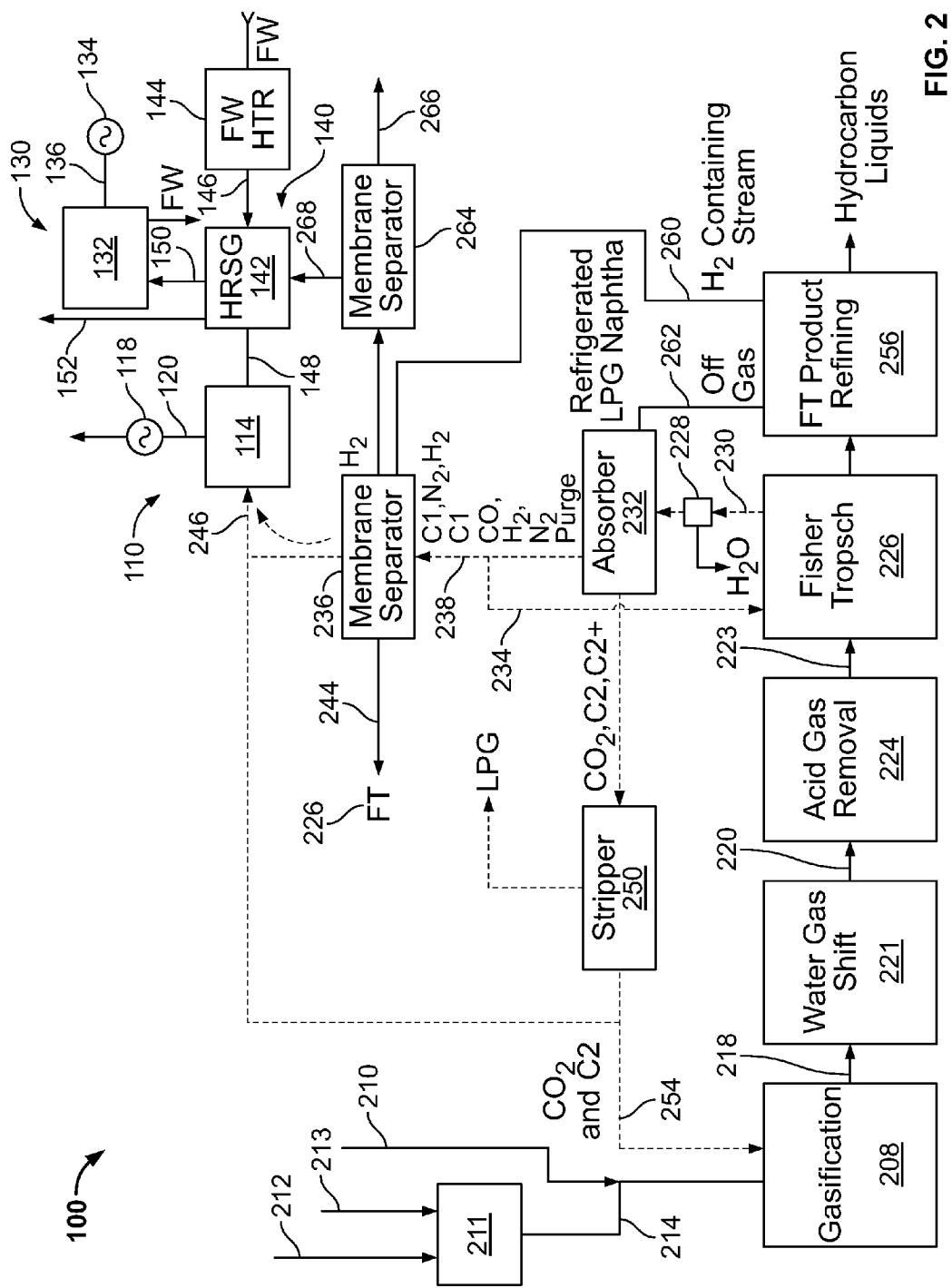

FIG. 2 is a schematic diagram of a gasification system 100 in accordance with another exemplary embodiment of the present invention. In the exemplary embodiment, a flow of $H_2$ generated in FT product refining subsystem 256 is channeled to membrane separator 236 through a conduit 260. The flow of $H_2$ from FT product refining subsystem 256 tends to increase a ratio of hydrogen in the feed to membrane separator 236 resulting in a greater capture of hydrogen for internal use within system 100 or export. Other gases from FT product refining subsystem 256 are captured and channeled to absorber 232 through a conduit 262. A second selective membrane separator 264 receives a flow of mostly hydrogen from membrane separator 236, which generates a flow 266 of contaminant free hydrogen for internal use and/or export and a flow 268 of remainder gases that are channeled to HRSG 142 for supplemental firing and/or venting. As used herein, contaminant free hydrogen is defined as being relatively pure hydrogen with no other substances intentionally remaining.

Embodiments of the invention include an FT tail gas treating system that facilitates eliminating the fuel gas imbalance by producing export power from the C1 and a minimum amount of purge gas. The advantages these embodiments provide are an increase in product revenue by co-product sale of power and increased LPG production (all C3+ captured as LPG), a reduction in gasification investment cost by increasing recycle of syngas in the FT tail gas to the FT reactor without increasing inert content in the FT reactor, production of a relatively high purity hydrogen stream compatible with the FT upgrading unit (hydrocracker), and recycling of $CO_2$ and C2 in the tail gas to gasification reactor 208, which facilitates reducing a recycle $CO_2$ requirement from AGR 224. C2 is also recycled to gasification reactor 208. The higher heating value of the C2 allows this material to be gasified with minimal additional oxygen consumption and minimal high value C1 is recycled to the gasifier.

The above-described embodiments of a method and system of treating tail gas of an FT reactor provides a cost-effective and reliable means for reducing a fuel gas imbalance in coal-to-liquids plants. More specifically, the method and system described herein facilitate reducing the effects of no gasifier recycle, increased purge syngas, and decreased fuel gas demand on the fuel gas imbalance. In addition, the above-described method and system facilitate increasing product revenue by coproduct sale of power and increased LPG production with substantially all C3+ captured as LPG, reducing coal gasification investment cost by increasing recycle of syngas in the FT tail gas to the FT reactor without increasing inert content in the FT unit, producing a high purity hydrogen stream compatible with an FT upgrading unit, and recycling $CO_2$ and C2 in the tail gas to the gasifier, which reduces the recycle $CO_2$ requirement from the acid gas removal unit and the higher heating value of the C2 allows it to be gasified with minimal additional oxygen consumption. As a result, the method and system described herein facilitate eliminating a fuel gas imbalance in a cost-effective and reliable manner.

An exemplary method and system for eliminating a fuel gas imbalance in a coal-to-liquids plant are described above in detail. The apparatus illustrated is not limited to the specific embodiments described herein, but rather, components of each may be utilized independently and separately from other components described herein. Each system component can also be used in combination with other system components.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A coal-to-liquids (CTL) conversion system comprising:
a coal gasifier configured to partially oxidize a coal fuel stream to generate a flow of synthesis gas (syngas);
a Fischer-Tropsch (FT) reactor configured to receive the flow of syngas and to generate a stream of tail gas;
an FT product refining subsystem coupled to said FT reactor and configured to discharge a flow of off-gas and a flow of hydrogen;
an absorber coupled in flow communication downstream of said FT reactor and configured to receive the stream of tail gas, said absorber further configured to generate a first flow comprising carbon dioxide, C2 hydrocarbons, and higher boiling gas components (C3+) and a second flow comprising C1, carbon monoxide, hydrogen, and nitrogen, said absorber coupled to said FT product refining subsystem to receive said discharged off-gas flow; and
a first membrane separator comprising a selective membrane configured to separate the second flow from the absorber generating a permeate flow of hydrogen and a non-permeate flow of combustion turbine fuel gas including methane and hydrogen, said first membrane separator coupled to said FT product refining subsystem to receive hydrogen flow discharged from said FT product refining subsystem.

2. A conversion system in accordance with claim 1, further comprising a gas purge of the second flow, said gas purge configured to generate a flow of purge gas including methane and hydrogen and a flow of remainder gases.

3. A conversion system in accordance with claim 1, further comprising a second membrane separator coupled in flow communication with said first membrane separator, said second membrane separator configured to generate a flow of substantially contaminant free hydrogen and a flow of remainder gases.

4. A method of treating tail gas of a Fischer-Tropsch (FT) reactor, said method comprising:
generating a flow of tail gas using an FT reactor;
absorbing carbon dioxide, C2 hydrocarbons, and C3-C7 hydrocarbons from the flow of tail gas generating a flow of lean tail gas including at least C1 hydrocarbons, carbon monoxide, hydrogen, and nitrogen and a flow of absorbent;
discharging a flow of off-gas and a flow of hydrogen from an FT product refining subsystem;
channeling the flow of off-gas to an absorber;
channeling the flow of hydrogen to a membrane separator;
purging the lean tail gas to generate a flow of purge gas including methane, nitrogen, and hydrogen and a flow of remainder gases;

separating the flow of purge gas generating a permeate flow of hydrogen and a non-permeate flow of combustion turbine fuel gas including methane, hydrogen and nitrogen; and channeling the non-permeate flow to a power generation system configured to generate a flow of electricity using the non-permeate flow.

5. A method in accordance with claim 4 further comprising drying the flow of tail gas in a glycol dryer to remove water.

6. A method in accordance with claim 4 wherein absorbing carbon dioxide, C2 hydrocarbons, and C3-C7 hydrocarbons from the flow of tail gas comprises absorbing carbon dioxide, C2 hydrocarbons, and C3-C7 hydrocarbons from the flow of tail gas using an absorbent including refrigerated liquefied petroleum gas (LPG) and naphtha.

7. A method in accordance with claim 4 wherein purging the lean tail gas comprises channeling the flow of remainder gases to the FT reactor.

8. A method in accordance with claim 4 further comprising recycling a first portion of the separated flow of purge gas to the FT reactor.

9. A method in accordance with claim 8 wherein recycling a first portion of the separated flow of purge gas to the FT reactor comprises recycling a first portion comprising substantially nitrogen-free hydrogen to the FT reactor.

10. A method in accordance with claim 4 further comprising channeling a second portion of the separated flow of purge gas to a pressure swing adsorption (PSA) unit generating a flow of substantially pure hydrogen and a flow of PSA tail gas.

11. A method in accordance with claim 10 further comprising channeling the flow of substantially pure hydrogen to a Fischer-Tropsch (FT) upgrading unit.

12. A method in accordance with claim 10 further comprising channeling the flow of PSA tail gas to a heat recovery steam generator (HRSG) for supplemental firing.

13. A method in accordance with claim 4 further comprising maintaining residual concentrations of hydrogen and carbon dioxide in the non-permeate flow of combustion turbine fuel gas to maintain a substantially constant Wobbe index of the non-permeate flow of combustion turbine fuel gas.

14. A method in accordance with claim 4 further comprising stripping carbon dioxide and C2 hydrocarbons from the absorbent.

15. A method in accordance with claim 14 further comprising channeling the stripped carbon dioxide and C2 hydrocarbons to a gasifier recycle carbon dioxide stream.

16. A method in accordance with claim 4 further comprising blending the stripped carbon dioxide and C2 hydrocarbons with the non-permeate flow of combustion turbine fuel gas to facilitate maintaining a substantially constant Wobbe index.

17. A Fischer-Tropsch tail gas treatment system comprising:

a Fischer-Tropsch (FT) reactor configured to generate a flow of tail gas;

an FT product refining subsystem coupled to said FT reactor and configured to discharge a flow of off-gas and a flow of hydrogen;

an absorber coupled in flow communication with said FT reactor and configured to receive the flow of tail gas, said absorber further configured to separate the tail gas into a flow of lean tail gas comprising at least C1 hydrocarbons, carbon monoxide, hydrogen, and nitrogen and a flow of absorbent comprising carbon dioxide, C2 hydrocarbons, and C3-C7 hydrocarbons, said absorber coupled to said FT product refining subsystem to receive said discharged off-gas flow;

a lean tail gas purge configured to generate a flow of purge gas including methane and hydrogen and a flow of remainder gases; and a membrane separator comprising a selective membrane configured to separate the flow of purge gas generating a permeate flow of hydrogen and a non-permeate flow of combustion turbine fuel gas including methane and hydrogen, said membrane separator coupled to said FT product refining subsystem to receive hydrogen flow discharged from said FT product refining subsystem.

18. A system in accordance with claim 17 further comprising a pressure swing adsorber (PSA) unit coupled in flow communication with the generated permeate flow and configured to generate a flow of substantially contaminate free hydrogen.

19. A system in accordance with claim 17 further comprising a coal gasifier configured to partially oxidize a coal fuel stream to generate a flow of synthesis gas (syngas), said FT reactor is configured to receive the flow of syngas from a coal gasifier.

20. A system in accordance with claim 17 comprising a CO2 stripper in flow communication between said absorber and a coal gasifier, said stripper configured to generate a flow of CO2 and C2 for recycle to an inlet of the coal gasifier and to generate a flow of liquid petroleum gas (LPG).

* * * * *